United States Patent
Breslow

[15] 3,696,126
[45] Oct. 3, 1972

[54] AZIDOFORMATES FROM REDUCED POLYMERIZED FATTY ACIDS

[72] Inventor: David S. Breslow, Wilmington, Del.

[73] Assignee: Hercules Incorporated, Wilmington, Del.

[22] Filed: Nov. 23, 1970

[21] Appl. No.: 92,275

[52] U.S. Cl. ............... 260/349, 260/97.5, 260/80.73
[51] Int. Cl. ............................................. C07d 109/00
[58] Field of Search ....................................... 260/349

[56] References Cited

UNITED STATES PATENTS 3,369,030  2/1968  MacArthur ............... 260/349

3,558,669  1/1971  Breslow ................... 260/349

Primary Examiner—John M. Ford
Attorney—John W. Whitson

[57] ABSTRACT

Polyols, obtained by hydrogenolysis of polymerized ethylenically unsaturated fatty acids, e.g., the diol from dimer acid, are converted to poly(azidoformate)s. These new poly(azidoformate)s, useful for cross-linking a wide variety of polymers, are relatively insensitive to shock and hence are not hazardous to handle or transport.

3 Claims, No Drawings

AZIDOFORMATES FROM REDUCED POLYMERIZED FATTY ACIDS

This invention relates to new poly(azidoformate)s and more particularly to azidoformates of long chain alcohols obtained by hydrogenation of dimer acids.

Azidoformates are a well known class of compounds that have many useful properties. One of the most outstanding properties of the poly(azidoformate)s is their ability to cross-link a wide variety of polymers. However, the prior art azidoformates have suffered from a serious disadvantage - namely, their sensitivity to shock, with the result that poly(azidoformate)s have generally been classified as explosives. This has, of course, meant extreme care in handling the compounds both in the laboratory and plant, and most important of all, has made shipping difficult. Thus, they must either be shipped in dilute solution, deposited on carbon black, or otherwise diluted.

Now, in accordance with this invention, poly(azidoformate)s of the polyols obtained on hydrogenation of long chain polymerized unsaturated fatty acids have been prepared, which poly(azidoformate)s are unique in that they are not sensitive to shock. Hence they can be transported without difficulty and used without any hazard. At the same time, they have all of the desirable properties of the prior art poly(azidoformate)s and in some cases are more effective in cross-linking polymers.

It is well known that long chain unsaturated fatty acids can be polymerized by heat, by treatment with a clay catalyst, by treatment with an acid catalyst, by treatment with a peroxide, or by some combination of these. The product of such a polymerization reaction is generally a mixture of dimers, trimers, tetramers, etc., up to octamers, the average degree of polymerization being from about 2 to about 4. The structure of these low polymers is not precisely known but the product is believed to contain a mixture of saturated, unsaturated, and cyclic polyfunctional carboxylic acids. The predominant reaction is polymerization by the bimolecular addition of unsaturated fatty acid radicals leading to the production of acyclic and monocyclic dibasic acids and acyclic, monocyclic and bicyclic tribasic, tetrabasic, etc. structures. These polybasic acids are frequently referred to as dimer acids, trimer acids, etc. Fatty acids that can be so polymerized are the mono-, di- and triethylenically unsaturated acids containing 11 to 22 carbon atoms, such as undecylenic acid, tetradecenoic acid, zoomaric acid, oleic acid, linoleic acid, linolenic acid, eleostearic acid, etc., and mixtures of these acids, such as the tall oil fatty acids, linseed oil fatty acids, soybean oil fatty acids, etc.

These polymerized acids are readily hydrogenated, as is well known in the art, to mixtures of saturated and unsaturated polyols. The polyols are then converted to poly(azidoformate)s by first reacting the polyol with phosgene to convert the hydroxyl groups to chloroformate groups and then reacting the latter with an azide such as sodium azide.

The poly(azidoformate)s so produced have outstanding utility as cross-linking agents for a wide variety of saturated and unsaturated polymers such as natural rubber, SBR, polybutadiene, EPDM rubbers, neoprene, butyl rubber, chlorosulfonated polyethylene, nitrile rubber, polyacrylates, urethane rubbers, polysulfides, polyethylene, polypropylene, etc.

The following examples will illustrate the preparation of the new poly(azidoformate)s of this invention and their use as cross-linking agents. All parts and percentages are by weight unless otherwise stated.

EXAMPLE 1

The polymerized acid used was a commercial dimerized tall oil fatty acid containing about 75 percent dimerized acid and about 25 percent trimerized acid. It had a bromine number of 50, an acid number of 191.7 and a molecular weight of about 635.

Four hundred fifty grams of this dimer acid was hydrogenolyzed in a 1,300 ml. stainless steel autoclave at 5,000 p.s.i. hydrogen pressure at 260°C., using 45 g. of a barium promoted copper chromite catalyst and 150 ml. of anhydrous methanol. Hydrogenation was continued until no more hydrogen was taken up; a total reaction time of about 7 hours. The hydrogen uptake was about 2.9 moles (94 percent of theory calculated from the acid number of the dimer acid). The product was filtered through a bed of filter aid, washed with methanol and with benzene, dried and solvents were removed under reduced pressure. The polyol so obtained was a pale yellow, viscous oil amounting to 367 g. (86 percent of theory). It had an hydroxyl number of 206.6; an acid number of 1.1, a saponification number of 6.2 and had a hydrogen uptake of 0.12 percent.

A mixture of 149 g. of the above polyol and 50 ml. of methylene chloride was added dropwise to 150 g. of liquid phosgene at 0°C. After stirring for about 16 hours at 3°C., the excess phosgene was removed by sparging with nitrogen and then applying a vacuum. A viscous, pale oil (180 g.) was obtained.

To a mixture of 81 g. of sodium azide, 100 ml. of water, 250 ml. of acetone and 500 ml. of methylene chloride, was added 175 g. of the above-prepared poly(chloroformate). The reaction mixture was stirred at room temperature for about 65 hours and then was diluted with 500 ml. of water. The organic layer was separated, washed three times with water and then was dried over sodium sulfate. There remained 850 ml. of solution containing 0.214 g./ml. of azide, i.e., a total of 182 g. of the poly(azidoformate). Evaporation of the solvent yielded a slightly viscous amber oil. Analysis by infrared showed it to contain 12.1 percent $N_3$. The calculated value for a complete conversion is 12.4

EXAMPLE 2

The polymerized acid used was a commercial trimer acid containing about 90 percent trimerized acid of 18 carbon atoms (soybean oil fatty acid). It had an acid number of 187.8 and a molecular weight of about 950.

Two hundred grams of this trimer acid was hydrogenolyzed as described in Example 1 for a total reaction time of 3 hours. The product was filtered through a bed of filter aid, washed with benzene and methanol and the solvents removed under vacuum. The product was a thick, clear, dark green liquid and amounted to 154.3 g. Analysis showed it to have a saponification number of 25.6, an hydroxyl number of 198.1 and a hydrogen uptake of 0.19 percent.

A mixture of 143 g. of this polyol and 50 ml. of methylene chloride was added to 150 g. of liquid phosgene at 0°C. After stirring for 20 hours at 3°C., the excess phosgene was removed by sparging with nitrogen and then applying a vacuum. The poly(chloroformate) so obtained amounted to 170 g. and was an amber, viscous oil.

A mixture of 165 g. of the poly(chloroformate), 81 g. of sodium azide, 100 ml. of water, 250 ml. of acetone and 500 ml. of methylene chloride was stirred rapidly at room temperature for about 65 hours. It was then diluted with 500 ml. of water, the organic layer separated, washed 3 times with water and dried over sodium sulfate. The poly(azidoformate) so obtained after removal of solvent amounted to 155 g. and was a viscous, amber oil. Analysis by infrared showed it to contain 11.4% $N_3$. The calculated value was 11.7%.

EXAMPLE 3

A polymerized undecylenic acid product was prepared by heating 1,000 g. of undecylenic acid with 100 g. of acid clay and 50 g. of water in a closed autoclave for 4 hours at 245°C. After cooling, the reaction mixture was treated with 1 liter of benzene, filtered, the benzene distilled off, and the residue stripped up to a pot temperature of 250°C. at 1 mm. pressure.

The residue was then hydrogenolyzed in methanol as described in Example 1. Removal of solvent left 458 g. of polyol, a yield for the two steps of 50 percent. The amber oil had a hydroxyl number of 320 and an acid number of 1.5.

A solution of 200 g. of this polyol in 100 ml. of methylene chloride was added over a period of 1 hour to 200 g. of phosgene at 0°C. The reaction was stirred in an ice bath for 18 hours, and the excess phosgene was removed by sparging with nitrogen. The chloroformate was then added to a mixture of 95 g. of sodium azide, 150 ml. of water, 300 ml. of acetone and 500 ml. of methylene chloride, and the reaction mixture was stirred for 4 days at room temperature. The organic layer was separated after adding 500 ml. of water, washed with water, dried over sodium sulfate, and the solvent evaporated. There was thus obtained 265 g. (94 percent of theory) of poly(azidoformate) as a pale amber oil. Analysis by infrared showed an azide content of 17 percent (theory 17.5 percent).

The above prepared poly(azidoformate)s were found to be insensitive to shock in the standard drop test using a 2 kg. weight (procedure described in "The Chemistry of Powder and Explosives," by T. L. Davis, Vol. I, John Wiley and Sons, Inc., New York, New York, 1941, page 21). They also passed the lead block compression test, i.e., they give compressions of less than 0.1 inch in a modified Trauzl lead block test (ibid page 24).

The following examples illustrate the high activity of these poly(azidoformate)s as cross-linking agents for various polymers.

EXAMPLE 4

Polyethylene was compounded with the dimer and trimer azidoformates prepared in Examples 1 and 2 by mixing the polyethylene with 1 percent by weight of phenolic antioxidant and a solution of 0.75 percent by weight of the azidoformate in methylene chloride and then removing the solvent. Each composition was cured by compression molding at 160°C. for 14 minutes. The sample cross-linked with the bis(azidoformate) of Example 1 had a percent swell of 4,480 and that cross-linked with the tris(azidoformate) of Example 2 had a percent swell of 3,570.

EXAMPLE 5

An EPDM elastomer (ethylene-propylene-1,4-hexadiene) was cross-linked with the dimer and trimer azidoformates of Examples 1 and 2. Samples of the EPDM elastomer were mixed on a 170°F. mill with 50 percent by weight of high abrasion furnace black and 5.93 and 5.95 percent by weight, respectively, of the dimer and trimer azidoformates. They were then cured at 150°C. for 35 minutes. Tabulated below are the physical properties of the rubbers so obtained.

|  | Poly(azidoformate) of | |
|---|---|---|
|  | Ex. 1 | Ex. 2 |
| Modulus 100%, p.s.i. | 230 | 300 |
| 200% | 625 | 860 |
| 300% | 1390 | 1850 |
| Tensile strength, p.s.i. | 2550 | 2520 |
| Elongation, % | 415 | 380 |
| Hardness (Shore A) | 60 | 63 |
| break set | 15 | 10 |

EXAMPLE 6

In this example the bis(azidoformate) of Example 1 was supported on fumed silica, the product containing 50 percent by weight of the azidoformate, and used for cross-linking the EPDM elastomer described in Example 5. The formulation and tensile properties are set forth below, the compounded elastomer being cured at 150°C. for 30 minutes.

| EPDM | 100 parts |
|---|---|
| High abrasion furnace black | 50 parts |
| Zinc oxide | 5.0 parts |
| Polymerized 2,2,4-trimethyl-1,2-dihydroquinoline | 0.5 part |
| The dimer bis(azidoformate) of Example 1 on fumed silica | 12.0 |
| Modulus, 100%, p.s.i. | 530 |
| Modulus, 200%, p.s.i. | 1550 |
| Modulus, 300%, p.s.i. | 2700 |
| Tensile strength, p.s.i. | 2800 |
| Elongation, % | 310 |
| Compression set (70 hrs. at 150° C.) | 30 |

What I claim and desire to protect by Letters Patent is:

1. The poly(azidoformate)s of the polyols obtained by hydrogenolysis of polymerized ethylenically unsaturated fatty acids having an average degree of polymerization of from about 2 to about 4, said fatty acids containing from 11 to 22 carbon atoms and having in the carbon chain at least one ethylene double bond.

2. The product of claim 1 wherein the polymerized fatty acids is dimerized tall oil fatty acids.

3. The product of claim 1 wherein the polymerized fatty acids is trimerized tall oil fatty acids.

* * * * *